3,160,637
5-HALOMETHYL DERIVATIVES OF 6-CHROMA-
NOLS AND METHODS FOR THEIR PREPARA-
TION
Bruce O. Linn, Plainfield, N.J., assignor to Merck & Co.,
Inc., Rahway, N.J., a corporation of New Jersey
No Drawing. Filed Mar. 19, 1963, Ser. No. 266,200
7 Claims. (Cl. 260—345.5)

This invention is concerned with 5-halomethyl derivatives of 6-chromanols and methods for their preparation. More particularly, it is concerned with the production of 5-halomethyl-6-chromanols by reacting γ-hydroxy side chain substituted derivatives of 1,4-quinones of the coenzyme group.

Oxidative phosphorylation is an essential reaction in the respiratory sequence of most living tissue. In this process energy is stored by the biosynthesis of ATP and released by the heterocylic cleavage of the active phosphate moiety of ATP. For the biosynthesis of ATP, low energy phosphate must be converted to high energy phosphate prior to its reaction with ADP to form ATP. It has therefore been of interest to prepare phosphate derivatives of chromanols of the coenzyme Q group.

It is an object of the present invention to provide new 5-halomethyl-6-chromanols which are useful as intermediates in the preparation of 5-phosphomethyl chromanols. Another object is to provide a method of producing these halomethyl compounds by reacting γ-hydroxy side chain substituted derivatives of 1,4-quinones of the coenzyme Q group with hydrogen halides. Other objects will be apparent from the detailed description of this invention hereinafter provided.

In accordance with the present invention, it is now found that γ-hydroxy side chain substituted derivatives of 1,4-quinones of the formula

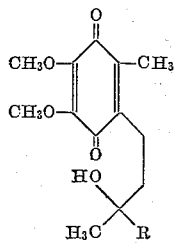

wherein R is a member from the group consisting of methyl and

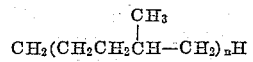

where $n$ is an integer from one to nine, can be reacted with a hydrogen halide to produce the corresponding 5-halomethyl chromanol of the formula

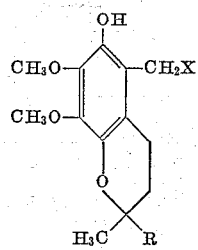

wherein R is the same as above and X is a halogen.

The reaction is carried out by intimately contacting the γ-hydroxy compound with an anhydrous hydrogen halide for sufficient time to complete the reaction. Thus, the reaction is conveniently effected by dissolving the starting compound in a suitable non-polar solvent such as carbon tetrachloride, ether, chloroform, and the like and adding the anhydrous hydrogen halide to the resulting solution. The reaction mixture is then allowed to stand at room temperature for sufficient time to complete the reaction. The desired 5-halomethyl compound is recovered by adding water, separating the solvent layer, and evaporating the dried solvent solution.

In carrying out the process of this invention, it is preferred to utilize hydrogen chloride as the hydrogen halide since the reaction is conveniently effected with this reagent and results in good yields of the desired product.

The following examples illustrate methods of carrying out the process of this invention and producing the new 5-halomethyl chromanols.

EXAMPLE 1

*5-Chloromethyl-7,8-Dimethoxy-2-Methyl-2-(4,8,12-Trimethyltridecyl)-6-Chromanol*

Anhydrous hydrogen chloride is bubbled into a solution containing 687 mg. of 2,3-dimethoxy-6-(3-hydroxy-3,7,11,15 - tetramethylhexadecyl)-5-methyl-1,4-benzoquinone in 25 ml. of anhydrous carbon tetrachloride until the orange colored solution turns dark red and then almost colorless (ca. 20 min.). The reaction mixture is allowed to stand at room temperature for an additional 30 min. and is then poured into 100 ml. of water. The organic layer is diluted with 200 ml. of ether, separated, and washed free of acid with water. The ether solution is diluted with benzene, separated from residual water and concentrated under reduced pressure. The residue is dissolved in benzene and the solution concentrated. Then the residue is dissolved in isooctane and the isooctane evaporated giving 5-chloromethyl-7,8-dimethoxy-2-methyl-2-(4,8,12-trimethyltridecyl)-6-chromanol:

$\lambda_{max.}^{isooctane}$ 303 m$\mu$ ($E_{1\,cm.}^{1\%}$ 77); $\lambda_{max.}^{neat}$ 2.85$\mu$, 7.73$\mu$, 8.02$\mu$, 8.36$\mu$ 8.60$\mu$, 8.87$\mu$, 9.00$\mu$, 9.57$\mu$, 9.71$\mu$, and 10.23$\mu$ The product gives a positive test for active halogen with ethanolic silver nitrate. The structure of the product is confirmed by nuclear magnetic spectroscopy.

Further proof of structure is obtained by treating the product with acetyl chloride; an essentially quantitative yield of 5-chloromethyl-7,8-dimethoxy-2-methyl-2-(4,8,12-trimethyltridecyl)-6-chromanyl acetate is obtained.

The 2,3-dimethoxy-6-(3-hydroxy-3,7,11,15-tetramethylhexadecyl)-5-methyl-1,4-benzoquinone used as the starting material in this example can be prepared as follows:

To a solution containng 5 g. of the 6-chromanol of hexahydrocoenzyme Q₄ [7,8-dimethoxy - 2,5 - dimethyl-2-(4,8,12-trimethyltridecyl) - 6 - chromanol] in 185 ml. of ether is added 185 ml. of 1.0 M ferric chloride in methanol-water (1:1). The two phase system is stirred at room temperature, 25° C., for 30 min., and then 300 ml. each of petroleum ether and water are added. The ether layer is washed with water, diluted with benzene, and separated from residual water. Evaporation under reduced pressure gives 2,3-dimethoxy - 6 - (3-hydroxy-3,7,11,15-tetramethylhexadecyl)-5-methyl-1,4-benzoquinone, $\lambda_{max.}^{isooctane}$ 276 m$\mu$ ($E_{1\,cm.}^{1\%}$ 322)

An analytical sample is prepared by column chromatography. One gram of the product is adsorbed from an isooctane solution onto 100 g. of Florisil packed in isooctane. The column is washed with ethanol-isooctane (1:99), and then the product is eluted with ethanol-isooctane (3:97) giving 2,3 dimethoxy-6-(3-hydroxy-3,7,11,15-tetramethylhexadecyl)-5-methyl-1,4-benzoquinone, $\lambda_{max.}^{isooctane}$ 276 m$\mu$ ($E_{1\ cm.}^{1\%}$ 325); $\lambda_{max.}^{neat}$ 2.80$\mu$, 6.06$\mu$, 6.21$\mu$, 7.90$\mu$, 8.30$\mu$ and 8.63

The nuclear magnetic resonance spectrum is consistent with the structure.

EXAMPLE 2

5-Chloromethyl-7,8-Dimethoxy-2,2-Dimethyl-6-Chromanol

Two hundred milligrams of 2,3 - dimethoxy - 6-(3 - hydroxy-3-methylbutyl)-5-methyl-1,4-benzoquinone is dissolved in 4 ml. of carbon tetrachloride and treated with anhydrous hydrogen chloride until the color of the solution nearly disappears. The solvent is evaporated in vacuo and the residue placed in a vacuum desiccator over potassium hydroxide to remove residual traces of hydrogen chloride. On standing the crude product crystallizes. The 5 - chloromethyl - 7,8 - dimethoxy - 2,2 - dimethyl-6-chromanol is recrystallized from cold ether, M.P. 125–130° (dec.)

$\lambda_{max.}^{isooctane}$ 305 m$\mu$ ($E_{1\ cm.}^{1\%}$ 144)

The 2,3 - dimethoxy - 6 - (3-hydroxy - 3-methylbutyl)-5-methyl-1,4-benzoquinone used as the starting material in the above example is prepared as follows:

Two hundred and fifty milligrams of the 6-chromanol of coenzyme $Q_1$, (7,8 - dimethoxy - 2,2,5 - trimethyl - 6-chromanol), is dissolved in 30 ml. of ether, and a mixture of 10 ml. of 5% ferric chloride in ethanol and 10 ml. of water is added slowly with rapid stirring. The reaction mixture is diluted with water and the layers separated. The ether solution is washed with water until neutral, and then dried over magnesium sulfate. Evaporation of the ether yields 2,3-dimethoxy-6-(3-hydroxy-3-methylbutyl)-5-methyl-1,4-benzoquinone. It is characterized by $\lambda_{max.}$ of 275–280 m$\mu$.

EXAMPLE 3

When 2,3-dimethoxy - 6 - (3-hydroxy-3,7,11,15,19,23, 27,31,35,39 - decamethyltetracontanyl) - 5 - methyl-1,4,-benzoquinone is treated with hydrogen chloride following the procedures described in Example 2, the corresponding 5-chloromethyl compound is produced.

The 5 - halomethyl-6-chromanols of the present invention are useful intermediates for the preparation of the corresponding 5-phosphomethyl compounds. Thus, for example, the chloromethyl compound can be reacted with acetyl chloride to produce the corresponding 6-acetate. This latter compound can be reacted with silver dibenzyl phosphate to produce the corresponding 5-dibenzyl phosphomethyl-6-acetoxy compound which is converted to the dihydrogenphosphate compound by reduction in the presence of a noble metal catalyst and the resulting 5-phosphomethyl-6-chromanyl acetate may be selectively hydrolyzed to produce the corresponding chromanol. These reactions are described in detail in the copending application Serial No. 266,201, filed March 19, 1963.

Various changes and modifications of the invention can be made, and to the extent that such variations incorporate the spirit of this invention, they are intended to be included within the scope of the appended claims.

What is claimed is:
1. A compound of the formula

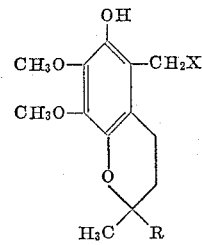

wherein X is a halogen and R is a member from the group consisting of methyl and

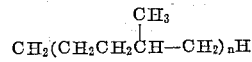

wherein $n$ is an integer from one to nine.

2. 5 - chloromethyl - 7,8 - dimethoxy - 2,2 - dimethyl-6-chromanol.

3. 5-chloromethyl - 7,8 - dimethoxy-2-methyl-2-(4,8,12-trimethyltridecyl)-6-chromanol.

4. A process which comprises reacting a compound of the formula

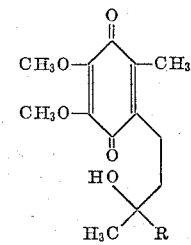

wherein R is a member from the group consisting of methyl and

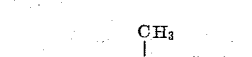

wherein $n$ is an integer from one to nine with a hydrogen halide to produce a compound of the formula

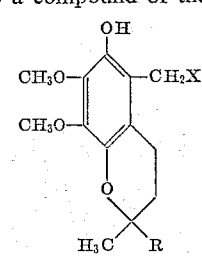

wherein R is the same as above and X is a halogen.

5. The process of claim 4 wherein the hydrogen halide is hydrogen chloride.

6. The process which comprises reacting 2-3-dimethoxy-6 - (3 - hydroxy - 3,7,11,15 - tetramethylhexadecyl) - 5-methyl-1,4-benzoquinone with hydrogen chloride to produce 5 - chloromethyl - 7,8 - dimethoxy - 2 - methyl - 2-(4,8,12-trimethyltridecyl)-6-chromanol.

7. The process which comprises reacting 2,3-dimethoxy-6 - (3 - hydroxy - 3 - methylbutyl) - 5 - methyl - 1,4 - benzoquinone with hydrogen chloride to produce 5-chloromethyl-7,8-dimethoxy-2,2-dimethyl-6-chromanol.

References Cited in the file of this patent
UNITED STATES PATENTS 2,486,542     Weisler et al. _____ Nov. 1, 1949
3,026,330     Folkers et al. _____ Mar. 20, 1962